Figure 1:
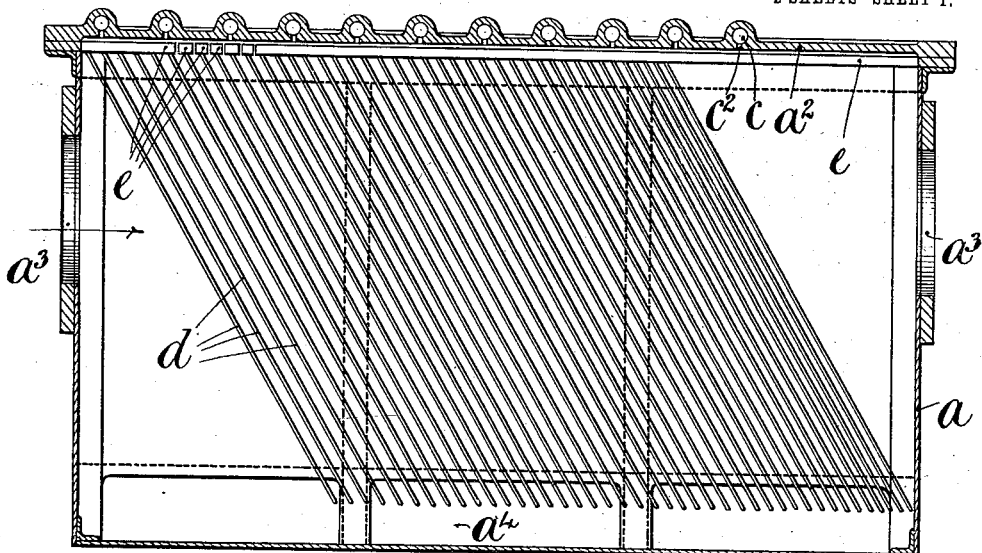

F. W. BURSTALL.
APPARATUS FOR EXTRACTING OR SEPARATING SUSPENDED MATTER FROM GASES.
APPLICATION FILED OCT. 15, 1910.

1,018,235.   Patented Feb. 20, 1912.
2 SHEETS—SHEET 1.

Witnesses.

Inventor.
Frederic W. Burstall.
By

F. W. BURSTALL.
APPARATUS FOR EXTRACTING OR SEPARATING SUSPENDED MATTER FROM GASES.
APPLICATION FILED OCT. 15, 1910.

1,018,235.

Patented Feb. 20, 1912.

2 SHEETS—SHEET 2.

Witnesses.

Inventor:
Frederic W. Burstall.
By James L. Norris,
Atty.

UNITED STATES PATENT OFFICE.

FREDERIC WILLIAM BURSTALL, OF BIRMINGHAM, ENGLAND.

APPARATUS FOR EXTRACTING OR SEPARATING SUSPENDED MATTER FROM GASES.

1,018,235.  Specification of Letters Patent.  Patented Feb. 20, 1912.

Application filed October 15, 1910. Serial No. 587,270.

*To all whom it may concern:*

Be it known that I, FREDERIC W. BURSTALL, a subject of the King of England, residing at Birmingham, in the county of Warwick, England, have invented new and useful Improvements in Apparatus for Extracting or Separating Suspended Matter from Gases, Particularly Tar from Combustible Gases, of which the following is a specification.

My invention provides an improved apparatus for extracting or separating suspended matter from gases, particularly tar from combustible gases.

Within a gas-tight chamber or box through which the gas to be operated upon travels, either by a slight suction or pressure, I provide numerous vibrating or quivering wires, or wire-like lengths, each of which has one end free or unsupported, and arrange in connection with these wires or lengths a suitable number of water, steam or other inlets which discharge into the chamber or box and onto the wires or lengths at an angle to the said wires or lengths, so that the combined actions of the gas treated flowing through the chamber and the spraying water or other fluid or substance set up a continuous vibrating or quivering effect of the wires or lengths through which the gases to be treated must pass during their passage through the chamber or box. The numerous wires or lengths preferably fill the greater part of the entire chamber or box from inlet to outlet, and are staggered, with each wire or length so arranged in respect of another that its extreme free end will always be clear of any other free end, although the greater part of each wire vibrates or quivers.

A preferred form of the invention is to fix the one ends of a number of stiff wires to a rigid bar with the other ends of the wires free, and to fixedly secure the bar carrying these wires to or within the chamber or box so that said wires are suspended or obliquely held, a number of such bars carrying wires being used so that the greater part of the chamber or box is filled, and to provide the water, steam, or other inlets vertically and discharging downwardly onto the obliquely ararnged wires, the passage of the gas treated being horizontal or approximately so and therefore at right angles to the water, steam or other issue.

It is desirable to depend upon the resiliency in the wires for vibration or quivering effect, started and maintained by the flow of gases and washing material, but it might be arranged to give the bars carrying the wires a slight mechanical movement to vibrate or quiver the said wires or lengths.

Figure 3:
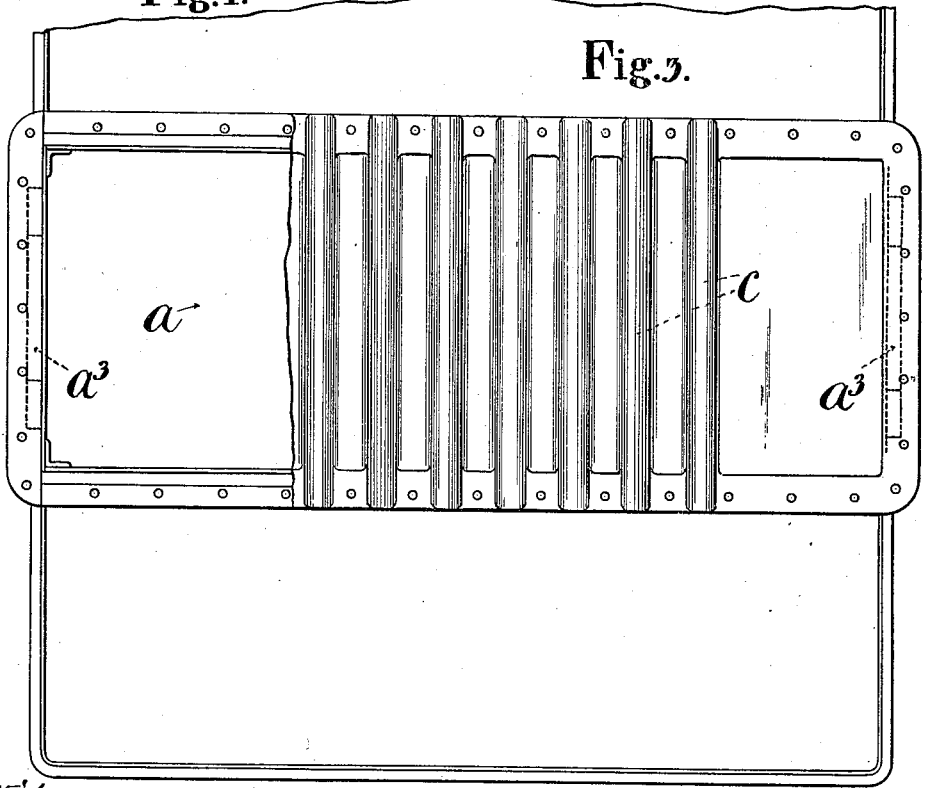
Figure 2:
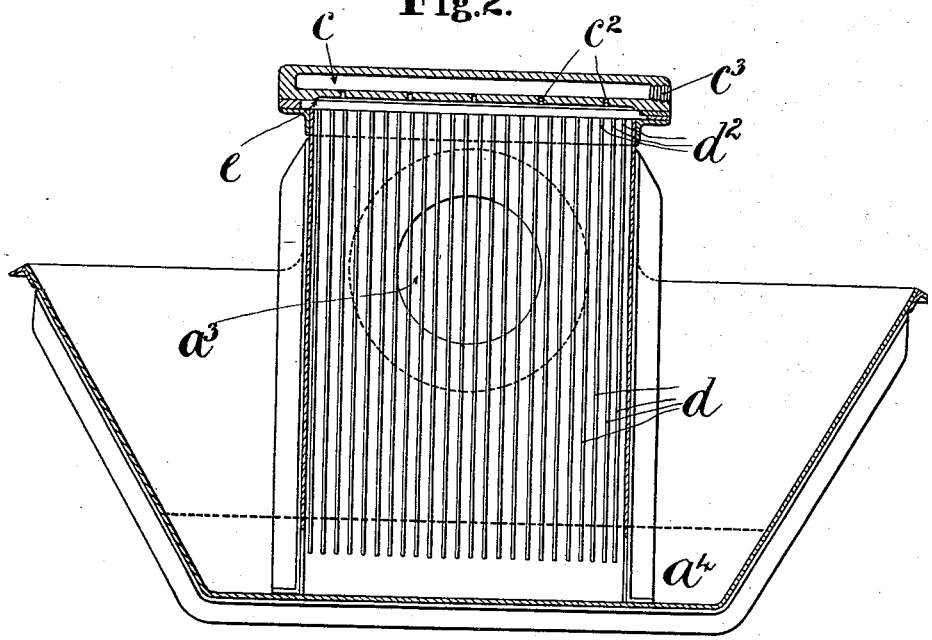

A desirable form of the invention for extracting tar and combustible gas is represented in the drawings by a longitudinal section Figure 1, a transverse section Fig. 2, and a partial plan Fig. 3.

The chamber or box $a$ is stationary and is of considerable size; it is provided with a removable lid $a^2$, with openings $a^3$ in its opposite end members, and with a water-sealed bottom $a^4$. The gas enters the chamber or box through one of the openings $a^3$, (in the present instance, the left-hand opening), and leaves the same through the other opening, (i. e., the right-hand opening), the said chamber or box itself being entirely gas-tight.

In connection with the lid $a^2$ are provided a number of water passages $c$, through which numerous small openings, $c^2$, communicate with the interior of the chamber or box in such manner that the water is jetted or sprayed into the interior of the apparatus. As will be seen from Fig. 1, longitudinally of the chamber or box the wires or wire-like lengths $d$ are numerous, and from Fig. 2 extend at small distances apart right across the interior of the structure, with their one ends $d^2$ fixed, and their other ends free, and as all these wire lengths are between the inlet and the outlet, and extend almost the full depth of the interior of the chamber or box, the gas passing therethrough must be broken up and made to pass in quite a circuitous manner through the greater part of the whole of the wires, particularly having regard to the fact that the chamber is much larger in depth and width than the inlet and outlet, which is desirable, and compels the expansion of the gas within the interior of the apparatus. Each of the wires or wire like lengths is able to vibrate or quiver independently, and it is not intended that they should touch at any time. It will be seen that the water inlets are arranged at an angle to the wires or wire like lengths.

In action it is believed that the wires vibrate or quiver within a dense water vapor or atmosphere provided by the liquid, and that the tar in suspension clings to the wires and gradually trickles downwardly off their free ends into the bottom of the chamber or box, where it can be removed, the vibrating or quivering of the wires being effected by the combined actions of the gas passing through the box and the water spraying onto the wires.

The water seal at the bottom of the box or chamber is sufficient to prevent any gas finding its way therethrough, and it is intended to provide so that the same water may be used over and over again by pumping the surplus of the seal into a pressure tank or pump supply suitably situated and connected up to the passages $c$, which passages $c$ preferably have their inlets $c^3$ alternately placed on different sides.

It is preferable to rigidly connect a number of wires or wire like lengths at their one ends to a bar such as $e$ whose length extends transverse of the chamber or box as shown in Fig. 2, this bar being narrow as shown in Fig. 1 and fixed rigid between the top of body of the chamber and the lid. This bar carries a single row of wires each of which is placed a small distance apart along the bar transversely of the chamber or box $a$. Longitudinally of the said chamber or box a number of such wire-carrying bars are fixed at distances apart to cross the chamber, with spaces between the said bars for the free passage of the water onto the wires.

The wires may be vertically suspended with the water inlets oblique, but it is desirable to arrange so that the inflow of water has no effect in quickening or slowing down the passage of the gas treated through the chamber, it being desirable to circulate the gas among the wires as much as possible before it leaves the chamber.

Although the invention has been mainly designed for the purpose of extracting tar from combustible gases it is equally applicable for extracting or separating other suspended matter from gases, as, for instance, for recovering ammonia, in which case the wires or wire lengths would be coated with lead. The washing material, dependent upon the gas treated, would be either oil, tar, or an acid or alkali. In addition to the extraction or separation the gases treated may be cooled by the action of the apparatus.

Having now described my invention what I claim and desire to secure by Letters Patent is:—

1. An apparatus for removing tar from gas, comprising, in combination, a gas-tight chamber provided at one end with a gas inlet and at the opposite end with a gas outlet; series of hanging resilient wires disposed within said chamber approximately at right angles to the direction of the gas flow therethrough and having their upper ends permanently and rigidly fixed; and means for spraying liquid directly against said wires, the combined action of the spray and the gas flow vibrating the wires independently of each other by reason of their resilience, to cause the tar deposited upon said wires to trickle down the latter and drip from the lower ends thereof onto the bottom of the chamber.

2. An apparatus for removing tar from gas, comprising, in combination, a gas-tight chamber provided at one end with a gas inlet and at the opposite end with a gas outlet; series of hanging resilient wires disposed obliquely within said chamber approximately at right angles to the direction of the gas flow therethrough and having their upper ends permanently and rigidly fixed; and means for spraying liquid vertically directly against said wires, the combined action of the spray and the gas flow vibrating the wires independently of each other by reason of their resilience, to cause the tar deposited upon said wires to trickle down the latter and drip from the lower ends thereof onto the bottom of the chamber.

In witness whereof I have hereunto set my hand in presence of two witnesses.

FREDERIC WILLIAM BURSTALL.

Witnesses:
  GEO. FUERY,
  F. A. BINNS.